United States Patent [19]

Ziegler

[11] Patent Number: 4,589,838

[45] Date of Patent: May 20, 1986

[54] MULTIPLE STATION, MULTIPLE CLAMP ASSEMBLY ROTARY BLOW MOLDING MACHINES

[76] Inventor: William E. Ziegler, 2570 Coachlite Dr., Tecumseh, Mich. 49286

[21] Appl. No.: 721,324

[22] Filed: Apr. 9, 1985

[51] Int. Cl.⁴ .................. B29C 17/07; B29C 17/12; B29D 23/03
[52] U.S. Cl. ..................................... 425/540; 425/541
[58] Field of Search .................. 425/539, 540, 541

[56] References Cited

U.S. PATENT DOCUMENTS

| | | | |
|---|---|---|---|
| 3,496,600 | 2/1970 | Heston | 425/540 X |
| 3,854,855 | 12/1974 | Pollock et al. | 425/541 X |
| 3,954,370 | 5/1976 | Pollock et al. | 425/541 X |
| 3,964,852 | 6/1976 | Marfiewicz | 425/541 |
| 4,439,127 | 3/1984 | Frohn | 425/541 X |

Primary Examiner—J. Howard Flint, Jr.
Attorney, Agent, or Firm—James M. Deimen

[57] ABSTRACT

Improvements in the mold opening and closing actuator mechanism in a multiple station, multiple clamp assembly rotary blow molding machine for the manufacture of plastic bottles and the like and improvements in the automatic unloader mechanism for the machine. In a rotary machine having an even number of stations and clamp assemblies rotatably indexable from station to station, the clamp assemblies are closed and opened by rotatable cranks and toggle mechanisms. Adjacent clamp assemblies are opened and closed by rotating the respective cranks in opposite directions for either the closing or the opening movements of the clamp assemblies. Rotary actuators at the mold closing and mold opening stations rotate 180° to actuate the clamp assemblies. By providing the above opposite rotational actuation of adjacent clamp assemblies the need to reverse or retract the rotary actuators during indexing of the clamp assemblies is eliminated as is the time required to reverse or retract. The clamp assemblies can thereby be more quickly indexed from station to station. The unloader mechanism at the mold opening station is mechanically driven from the rotary indexable table drive of the machine thereby providing positive mechanical timing for the unloader to grasp the part and lift the part from the mold as the mold halves separate. The mechanical drive includes a crank drive for vertical motion of the unloader and a rotary indexable drive for movement of the part from the mold opening station to a nearby conveyor.

23 Claims, 11 Drawing Figures

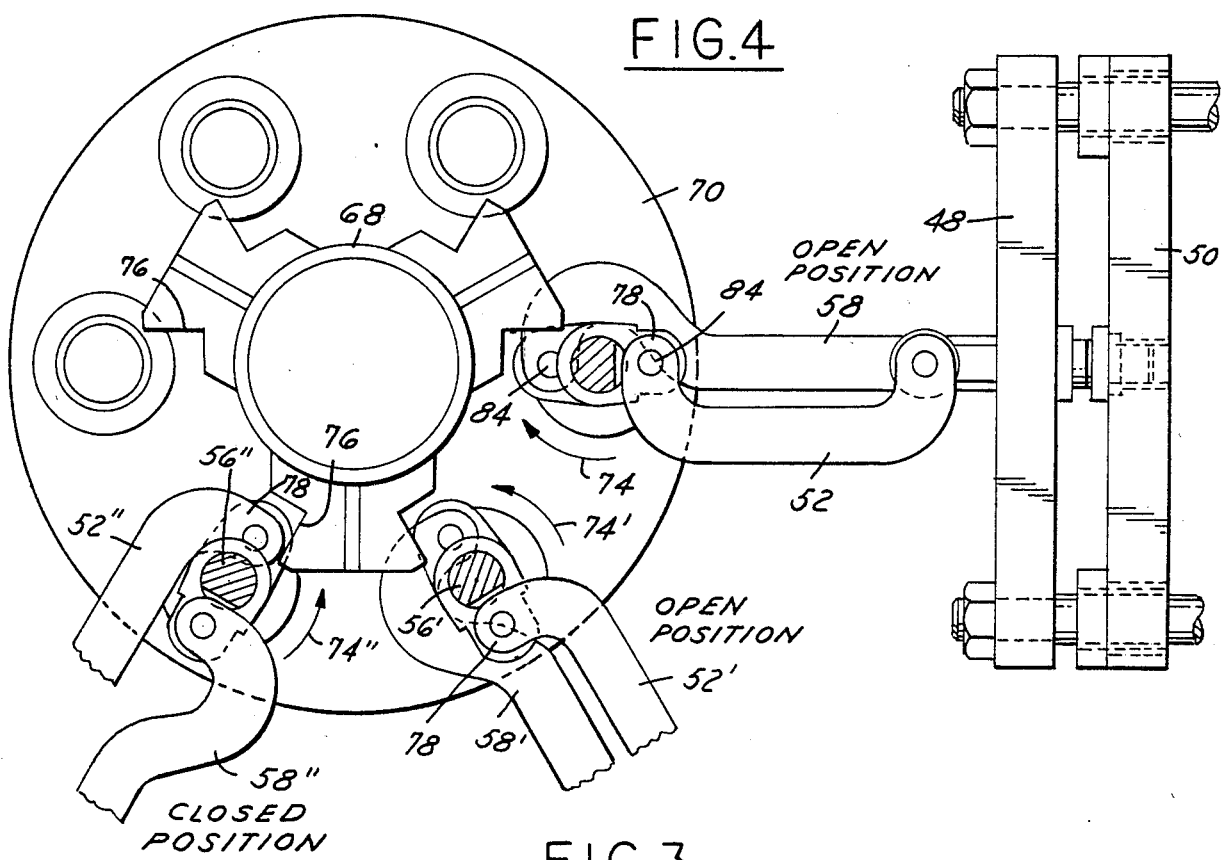
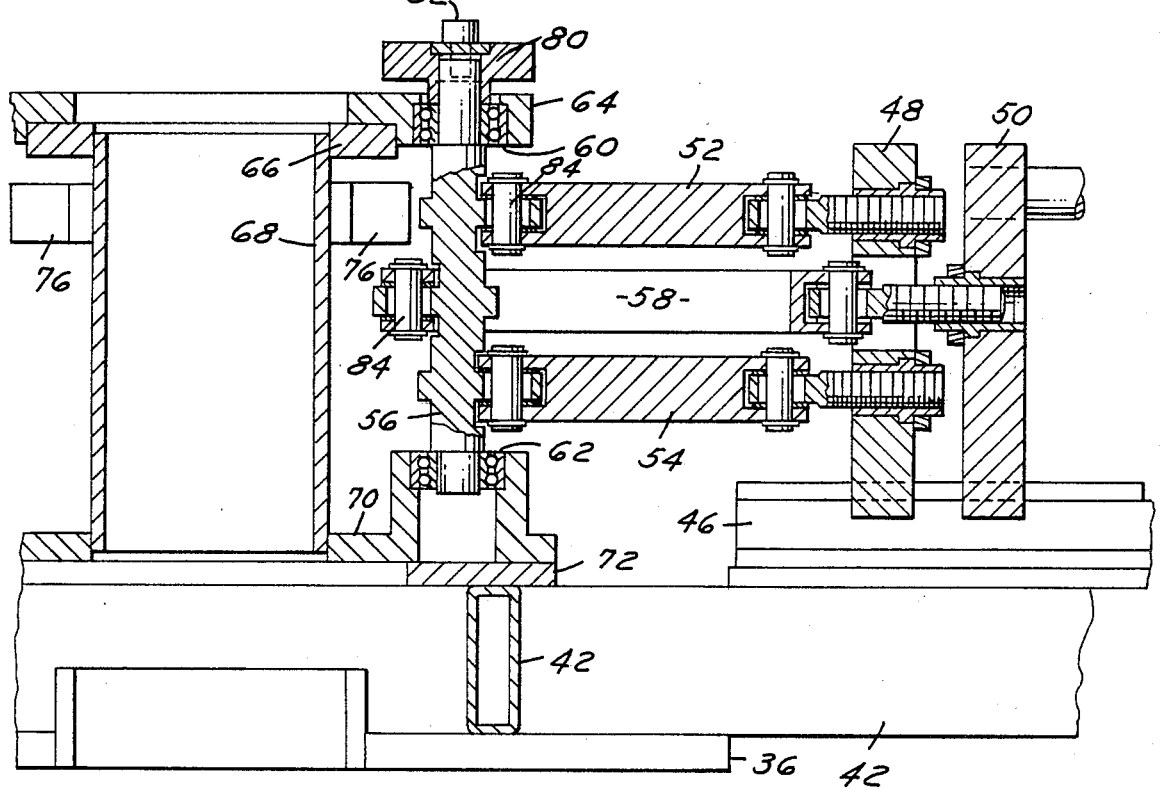

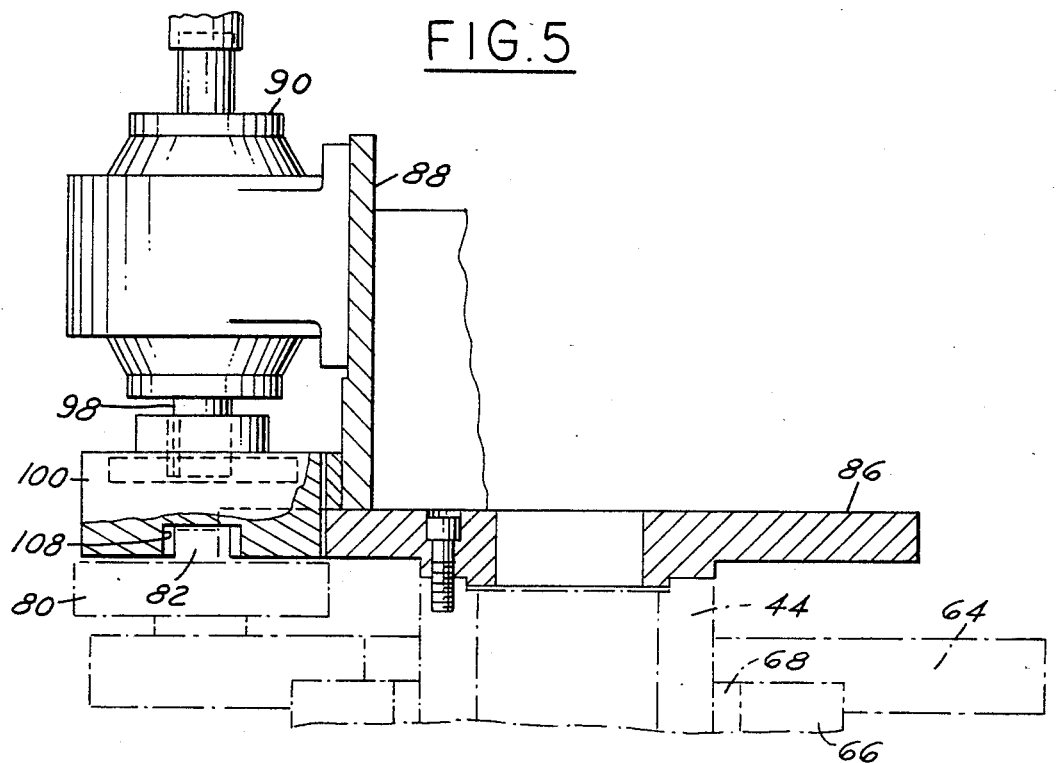
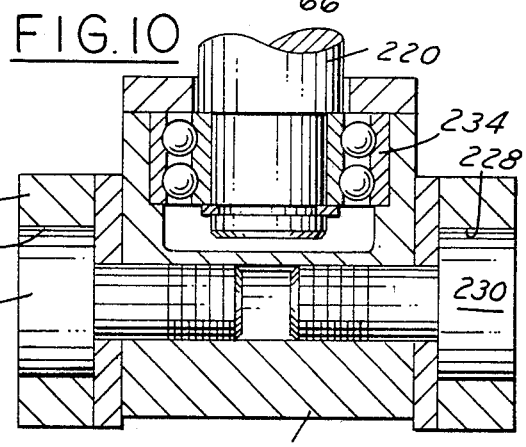
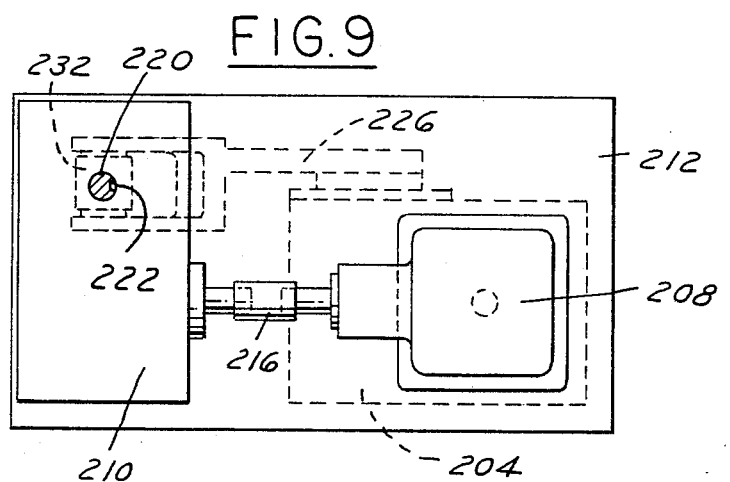

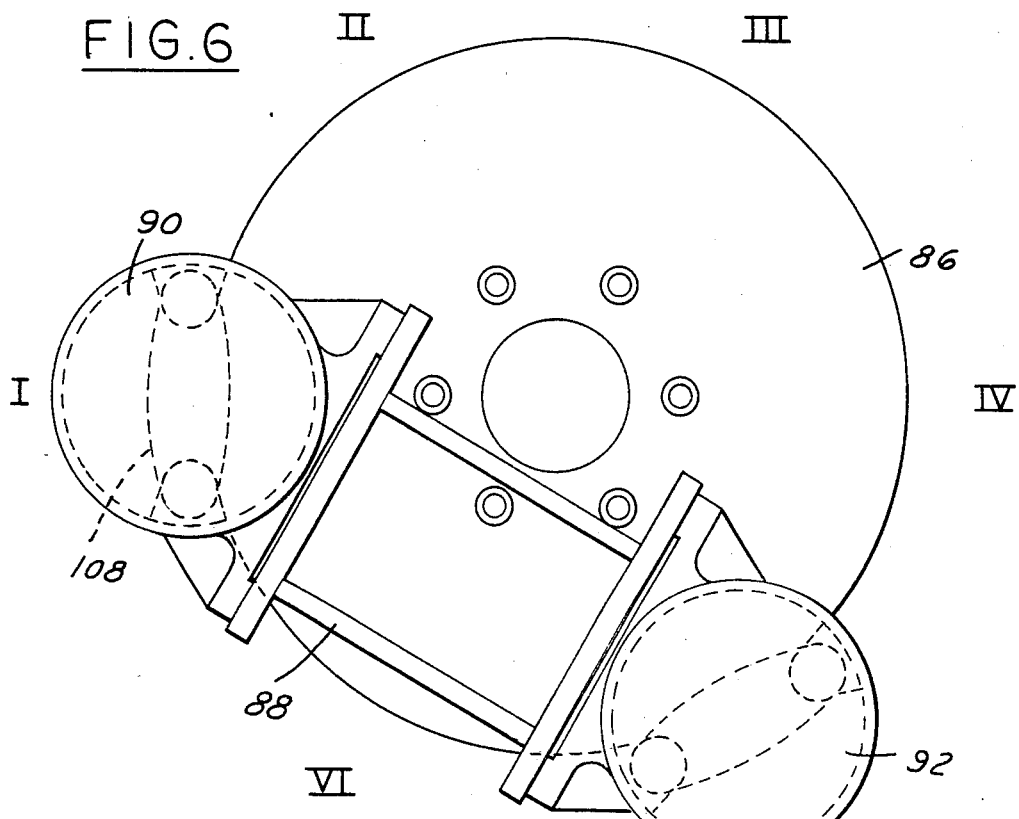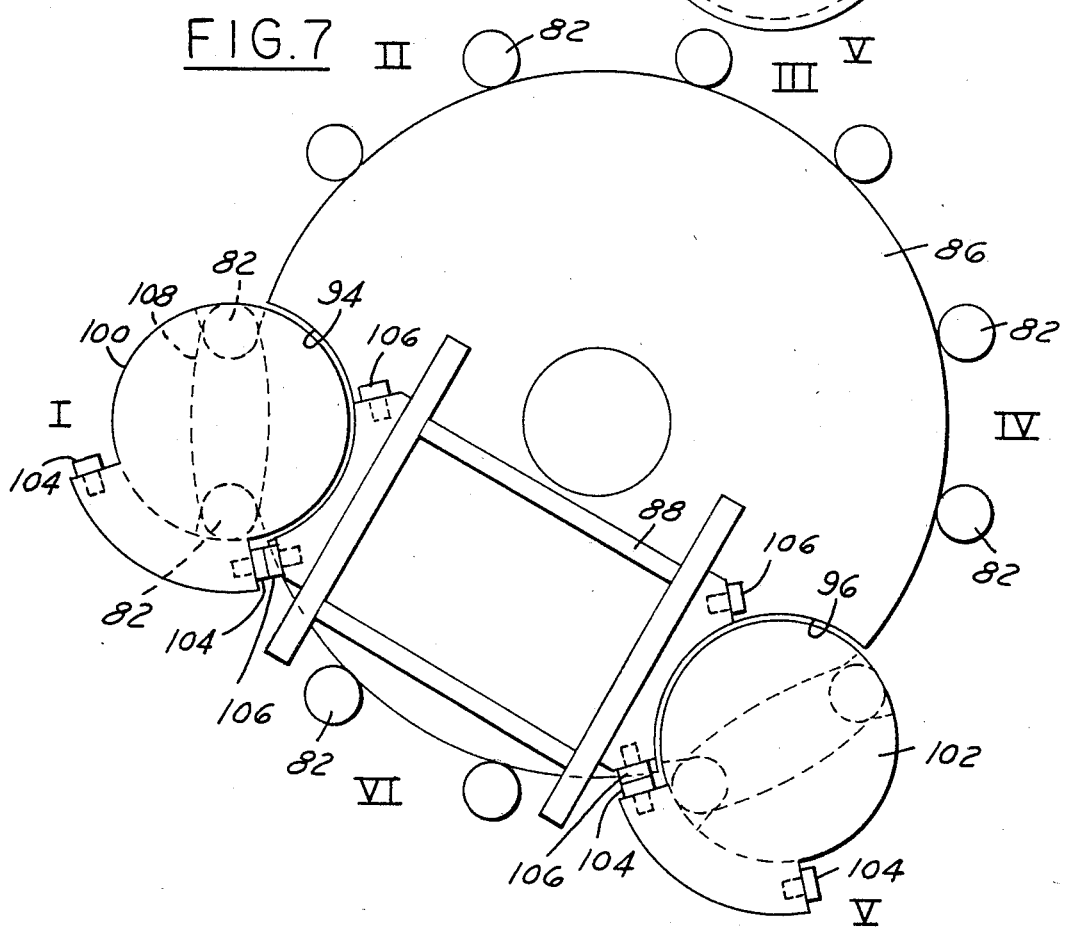

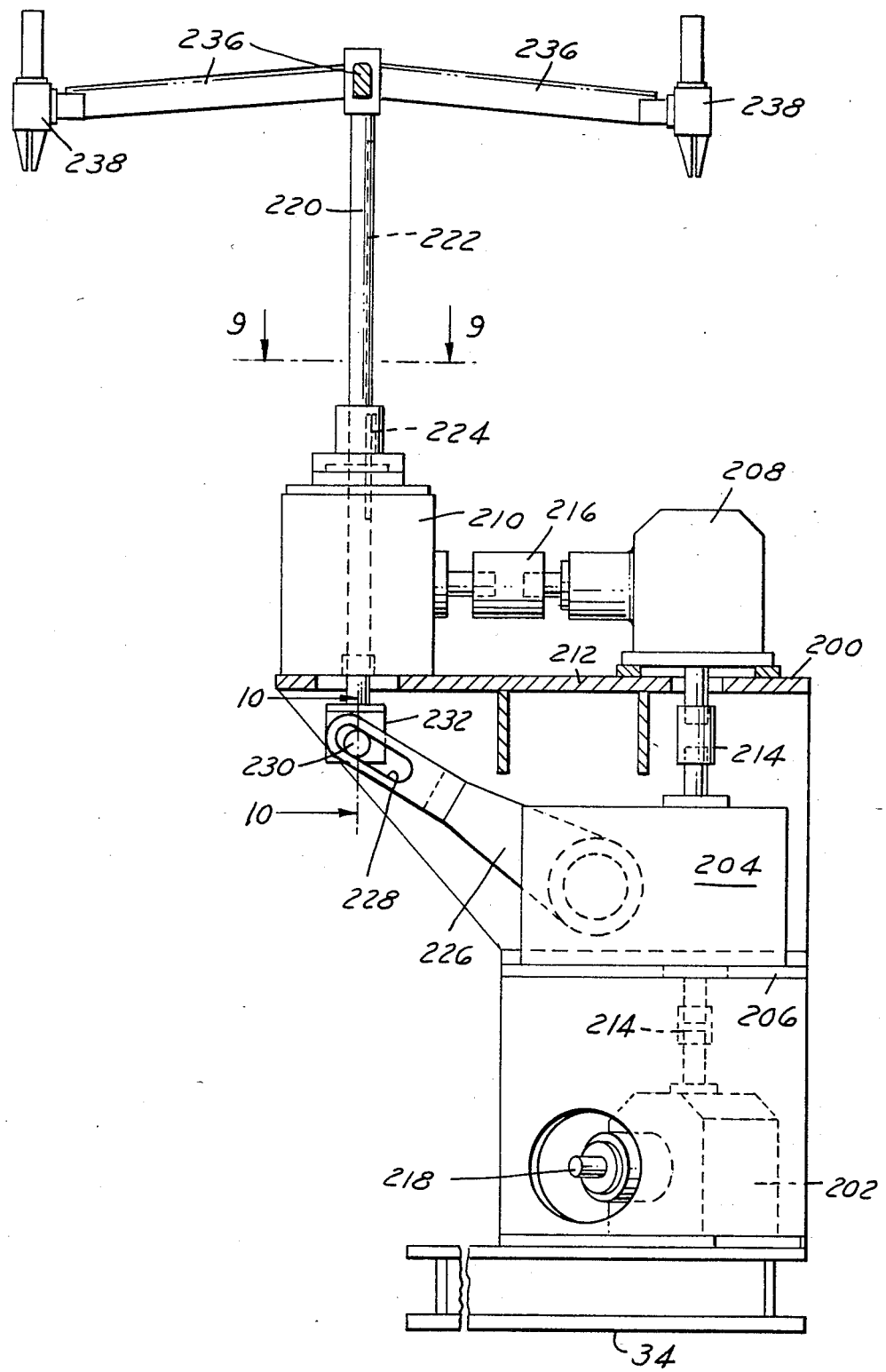

MULTIPLE STATION, MULTIPLE CLAMP ASSEMBLY ROTARY BLOW MOLDING MACHINES

BACKGROUND OF THE INVENTION

The improvements pertain to multiple station, multiple clamp assembly rotary blow molding machines for the manufacture of bottles and the like. In particular, the improvements pertain to eliminating reversal or retraction of rotary actuators at the mold closing the mold opening stations and provision of a mechanically driven and timed unloader mechanism at the mold opening stations. The improvements comprise further improvements to a multiple station, multiple clamp assembly rotary blow molding machine described in applicant's pending U.S. patent application Ser. No. 642,998 filed Aug. 21, 1984. The improvements, however, are not limited to such a machine.

Multiple station blow molding machines of circular or rotary configuration comprise machines with a plurality of stations located about a circular path. Such a machine includes a plurality of clamp assemblies, each containing a mold for one or more bottles. The total number of clamp assemblies equals the total number of stations. The clamp assemblies rotatably index from station to station about the circular path with various operations taking place either at the various stations which are of fixed location or during movement between stations.

In a typical machine each clamp assembly requires a mechanism for closing and opening the clamp assembly to thereby close and open the mold therein and means to assure that the mold remains tightly clamped together during the blowing and prefinishing stages of making the bottle. In applicant's above noted machine, a multiple toggle mechanism actuated by a rotary actuator at the mold close station and a second rotary actuator at the mold open station provides the mechanism. Means are provided on each clamp assembly to engage the rotary actuators at the mold close and mold open stations and to prevent movement of the toggles otherwise than by the rotary actuators. During indexing movement, however, the rotary actuators must reverse and retract in the time between disengagement with the receding clamp assembly and engagement with the approaching clamp assembly. Time and motion are thus wasted in the operation of the machine.

Unloader mechanisms at the mold open station typically comprise a grasping means at the end of an arm that reaches into the clamp assembly from the top or side. Such arms are usually actuated by one or more pneumatic or hydraulic cylinders in response to timing switches or valves on the machine in turn actuated by movement of other portions of the machine. Such pneumatic or hydraulic unloaders are subject to timing difficulties during set-up of the machine and with changes in molds. With the above difficulties in mind, the following improvements have been created.

SUMMARY OF THE INVENTION

The invention comprises further improvements in the mold opening and closing actuator mechanism and the automatic unloader mechanism in a multiple station, multiple clamp assembly rotary blow molding machine for the manufacture of plastic bottles and the like. In a rotary machine of applicant's design having an even number of stations and clamp assemblies rotatably indexable from station to station, the clamp assemblies are closed and opened by rotatable cranks and toggle mechanisms. Adjacent clamp assemblies are opened and closed by rotating the respective cranks in opposite directions for either the closing or the opening movements of the clamp assemblies. Rotary actuators at the mold closing and mold opening stations rotate 180° to actuate the clamp assemblies. By providing the above opposite rotational actuation of adjacent clamp assemblies, the need to reverse or retract the rotary actuators during indexing of the clamp assemblies is eliminated as is the time required to reverse or retract. The clamp assemblies can thereby be more quickly indexed from station to station. Wasted time and wasted motion are saved. In addition, the raising and lowering of the rotary actuators during indexing provided in applicant's five station machine, disclosed in the above referenced application as a redundant safety feature, is rendered unnecessary with the improvement herein because the clamp assembly leaving the actuator equipped station assures that the actuator is positioned properly to receive the approaching clamp assembly.

To assure accurate timing of the unloader at the mold open and unload station, the unloader mechanism is mechanically driven from the rotary indexable table drive of the machine thereby providing positive mechanical timing for the unloader to grasp the part and lift the part from the mold as the mold halves separate. The mechanical drive includes a reversible crank drive for vertical motion of the unloader and a rotary indexable drive for movement of the part from the mold open station to a nearby conveyor.

DESCRIPTION OF THE DRAWINGS

FIG. 3 is a partial cutaway side view of a single clamp assembly toggle linkage;

FIG. 4 is a partial cutaway plan view of the clamp assembly toggle linkage of FIG. 3;

FIG. 5 is a cutaway side detail of a rotary actuator and engagement means;

FIG. 6 is a schematic plan view of the rotary actuators and mounting;

FIG. 7 is a schematic plan view illustrating the rotary actuator stops;

FIG. 8 is a partial cutaway side view of an automatic unloader for the machine;

FIG. 9 is a top view of the unloader taken along the line 9—9 in FIG. 8;

FIG. 10 is a sectioned detail of the unloader taken along the line 10—10 of FIG. 8.

DESCRIPTION OF THE PREFERRED EMBODIMENTS

Figure 1:
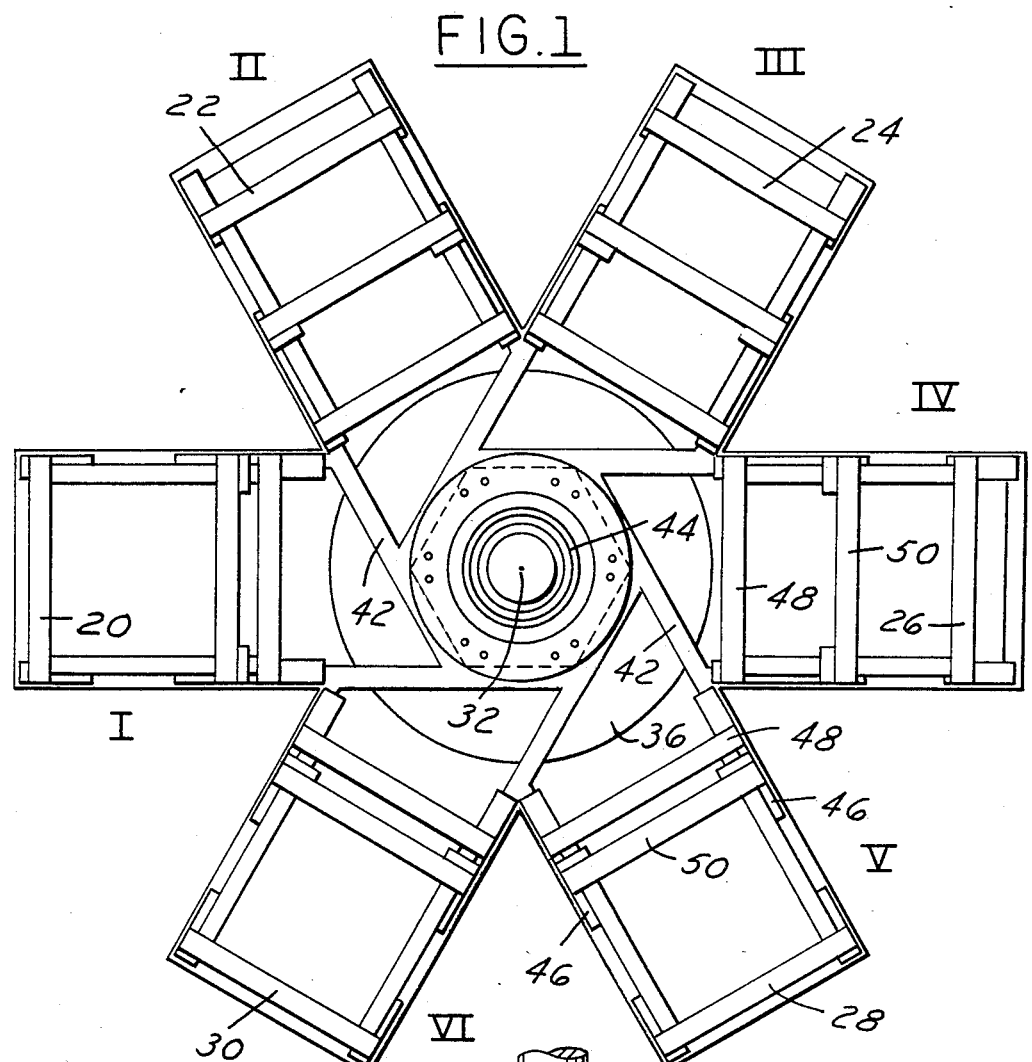
FIG. 1 is a schematic partial plan view of a six station rotary machine showing the clamp assemblies and stations.
Figure 2:
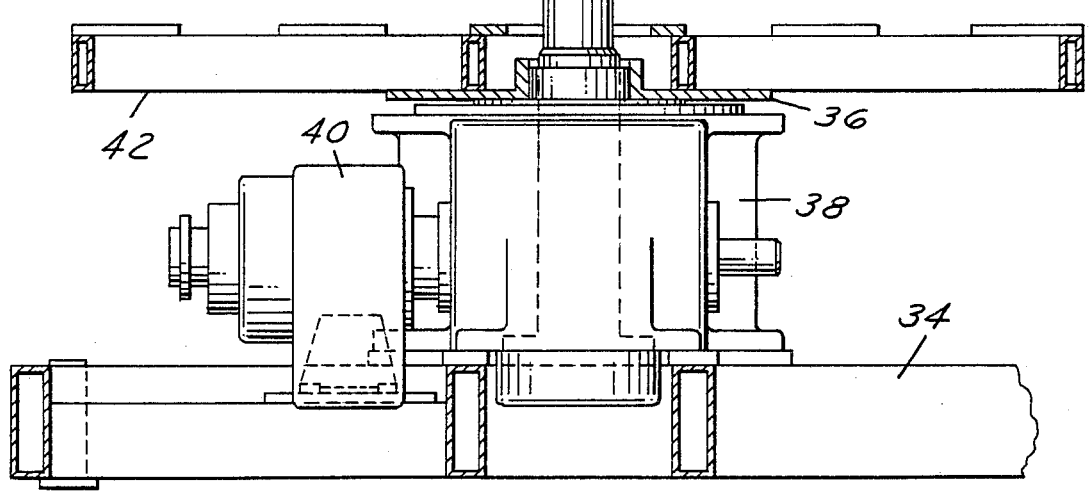
FIG. 2 is a schematic partial cutaway side view of the machine base showing two frames for the clamp assemblies.
Figure 11:
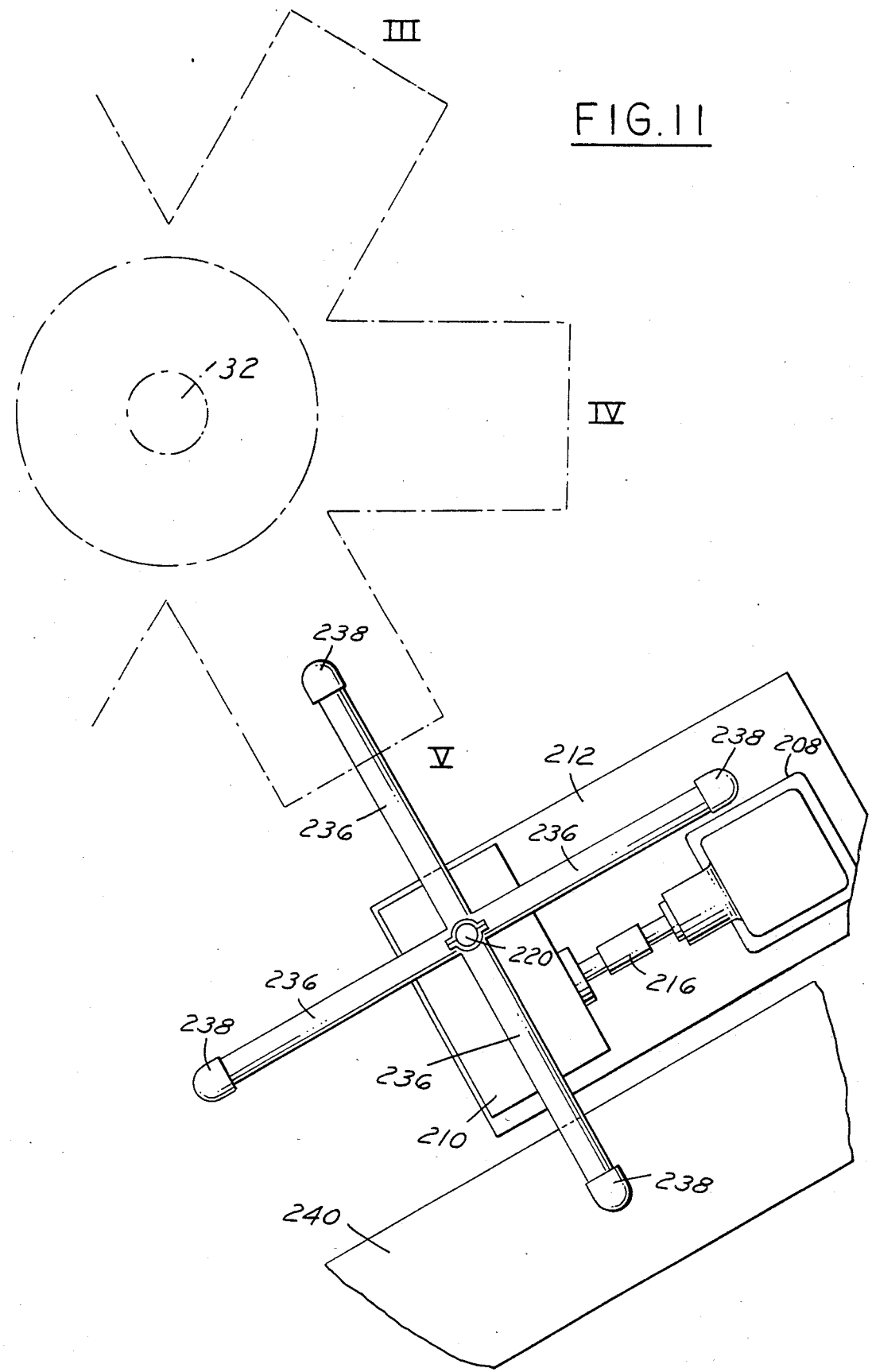
FIG. 11 is a schematic top view of the unloader in relation to the machine.

Reference is hereby made to applicant's U.S. patent application Ser. No. 642,998 which discloses a five station rotary blow molding machine with substantially the same clamp assemblies and base structure. In FIGS. 1 and 2 the six stations of the modified machine are identified by Roman Numerals I through VI. The six stations are fixed locations on the machine through which the six clamp assemblies 20, 22, 24, 26, 28 and 30 indexably rotate about the center 32. The clamp assemblies 20 through 30 dwell at each station I through VI and then simultaneously index therebetween. As shown, the clamp assemblies 20, 28 and 30 are open at stations I, V and VI and the clamp assemblies 22, 24 and 26 are closed at stations II, III and IV. In actual operation station I is the clamp assembly close station wherein the molds contained within the clamp assembly are closed about one or more parisons descending from an extruder thereabove (not shown).

In FIG. 2 the base 34 of the machine supports an indexable table 36, drive unit 38, gear box 40 and more (not shown). The table 36 supports six frames 42 for the clamp assemblies 20 through 30. The table 36 rotates about a stationary central support 44 affixed to the base of the machine.

As shown in FIGS. 3 and 4 the clamp assembly platens 48 and 50 rest on and are guided by rails 46 affixed to the frame 42. Platen 48 is attached and actuated by upper 52 and lower 54 toggle links in turn actuated by crankshaft 56. Platen 50 is attached and actuated by middle toggle link 58 in turn also actuated by crankshaft 56. In FIGS. 3 and 4 the clamp assembly platens 48 and 50 are shown in the open position as at stations I, V or VI. Crank 56 is mounted in upper 60 and lower 62 bearings. Upper bearing 60 is mounted in a ring 64 in turn affixed to a second ring 66 supported on a sleeve 68. The sleeve 68 fits over the central support 44 above the table 36 and frames 42. Sleeve 68 is affixed to a circular ring 70 which includes supports for the lower bearing 62. The ring 70 rests on a circular ring 72 in turn affixed to the frames 42. The entire mechanism of FIGS. 3 and 4 rotates and indexes with table 36 thus moving the clamp assemblies from station to station about the center 32.

In FIG. 4 arrows 74 and 74' indicate the rotational movements of crankshafts 56 and 56' to actuate the toggles and close the clamp assemblies. Comparing the adjacent toggle mechanisms, the crankshafts 56 and 56' are rotated in opposite directions 74 and 74' to close the clamp assemblies. The identical toggle links 52 and 52' and 58 and 58' are located on opposite sides of their respective crankshafts 56 and 56'. Crankshaft 56" and toggle links 52" and 58" illustrate the toggle link positions with the clamp assembly closed. Arrow 74" illustrates the rotation of shaft 56" necessary to open the clamp assembly attached thereto. Each shaft and toggle mechanism is rotatable 180° to close and 180° in the opposite direction to open. However, the toggle mechanism identified by the single primes (') and located between the other two toggle mechanisms rotates counterclockwise to close the clockwise to open whereas the other two toggle mechanisms rotate clockwise to close and counterclockwise to open. Thus, the opening and closing rotations of alternating toggle mechanisms and the link locations are identical and opposite the rotations and link locations of toggle mechanisms therebetween. The actual rotation of the crankshaft, however, only occurs at station I (mold close) and station V (mold open).

To prevent the toggle mechanisms from overcentering beyond the proper rotation for tight closing of the clamp assemblies, stops 76 are vertically located on the sleeve 68 to engage inner ends 78 of the upper links 52. To rotate the crankshafts 56 and thereby actuate the toggle mechanisms, a disk 80 is affixed to the top of each crankshaft and mounted atop each disk diametrically opposite are a pair of roller followers 82. The roller followers 82 are mounted adjacent the opposite ends of a diameter of the disk 80. The diameter defined by the roller follower 82 centers is substantially perpendicular to the diameter defined by the centers of the pins 84 that attach the toggles to the crankshaft 56.

Referring to FIGS. 5, 6 and 7, bolted atop the center support 44 is a guide plate 86 upon which is affixed a support weldment 88 for a pair of rotary actuators 90 and 92. Rotary actuator 90 is located at station I and upon actuation rotates to close the clamp assembly therebelow at station I. Rotary actuator 92 is located at Station V and upon actuation rotates to open the clamp assembly therebelow at station V. With the exception of stations I and V the guide plate 86 is circular and the pairs of followers 82 engage the guide plate as the clamp assemblies index about the machine. The engagement of the followers 82 prevents the rotation of the crankshafts 56 in either direction except at stations I and V.

At stations I and V guide plate 86 includes substantially semi-circular concavities 94 and 96. Attached to the vertical shaft 98 of each rotary actuator are engagement plates 100 and 102. Each engagement plate 100 or 102 includes a pair of stops 104 which are engageable with stops 106 on the weldment 88 to limit the rotation of the rotary actuators 90 and 92 to 180°. As each clamp assembly indexes into station I in sequence, the pair of followers 82 engage the engagement plate 100 within the curved sided channel 108. The rotary actuator 90 turns clockwise or counterclockwise 180° in sequence for each clamp assembly, thereby rotating the crankshafts 56, 56', 56" and shutting the clamp assemblies.

Similarly rotary actuator 92 turns engagement plate 102 at station V clockwise or counterclockwise to open successive clamp assemblies as they index into station V. The alternating rotational closing and opening directions for the successive crankshafts 56, 56' and 56" eliminates a wasted reversal or retraction rotation of the rotary actuators between the instant the trailing follower 82 leaves the engagement plate channel 108 and the instant the leading follower 82 of the next clamp assembly enters the engagement plate channel 108. This segment of time during indexing can thereby be eliminated along with the wasted rotary actuator movement.

In FIGS. 8 through 11 is shown an automatic unloader for the six station machine of this application or the five station machine in applicant's above referenced patent application. The unloader is also adaptable to other blow molding machines wherein the part can be grasped from above the mold and removed from the mold as the mold opens to release the part. Resting upon the base 34 of the machine is a support frame 200 substantially enclosing a lower right angle gear box 202, a crank index drive 204 on a shelf 206, and an upper right angle drive 208 and rotary index drive 210 on the frame top 212. The lower gear box 202, crank index drive 204 and upper right angle drive 208 are joined by two coupling assemblies 214. The rotary index drive 210 is joined to the upper gear box 208 by a coupling assembly 216. The unloader is driven by a power take off shaft from the table drive unit 38 mechanically coupled to the input shaft 218 of the lower gear box 202. The mechanical drive to the unloader assures that the unloader timing is always synchronized with the machine indexing and mold opening timing.

Extending vertically through the rotary index drive 210 is a shaft 220 having an extended keyway 222 in turn engaged by a key 224 in the rotary index drive. Extending from one side of the crank index drive 204 is a crank arm 226 mounted on a horizontal shaft. The crank arm 226 is bifurcated at the outboard end and formed with parallel slots 228. The slots 228 engage a pair of trunnions 230 affixed to a block 232 at the lower end of the vertical shaft 220. The block 232 is affixed to the shaft 220 by a ball bearing assembly 234. The crank arm 226 rotates upwardly and downwardly through an arc of about 60° to raise and lower the shaft 220.

Atop the vertical shaft 220 are four horizontal arms 236 having suitable gripping means 238 thereattached. When the vertical shaft 220 is lowered by the crank arm 226, the gripping means over station V grasps a newly formed part and the gripping means 180° opposite thereto releases a previously formed part onto the conveyor 240. After the crank arm 226 raises the vertical shaft 220 the rotary index drive 210 rotates shaft 220 90° for the next lowering and raising sequence.

Suitable index drives for the unloader are an FD-300-60 for the crank index drive 204 and an FD-300 four stop for the rotary index drive 210 both from Ferguson Machine Co., St. Louis, Mo. The interconnection of the index drives assures that the proper vertical and rotational indexing of the unloader is maintained.

I claim:

1. A multiple station, multiple clamp assembly rotary blow molding machine comprising dual opposed moveable mold platens in each clamp assembly, at least one toggle linkage actuatably attached to each platen, rotatable crank means in engagement with each toggle linkage for actuation thereof and engagement means on said crank means for rotatable actuation thereof, said crank means on sequential clamp assemblies rotatable in opposite directions to close the respective mold platens of the sequential clamp assemblies.

2. The blow molding machine of claim 1 wherein the corresponding toggle linkages of sequential clamp assemblies are positioned on opposite sides of the respective crank means.

3. The blow molding machine of claim 1 including at least one rotary actuator at a station on the machine, said rotary actuator adapted to engage the engagement means of clamp assemblies in sequence and to rotate the engagement means of each clamp assembly in the opposite direction from the rotation for the previous clamp assembly.

4. The blow molding machine of claim 1 including a rotary actuator at the mold close station and a second rotary actuator at the mold open station, said rotary actuators adapted to engage the engagement means of clamp assemblies in sequence and to rotate the engagement means of each clamp assembly in the opposite direction from the rotation for the previous clamp assembly.

5. The blow molding machine of claim 4 including means to prevent rotary motion of the crank means of clamp assemblies outside of the full engagement of the engagement means with either of the rotary actuators.

6. The blow molding machine of claim 4 wherein said rotary actuators are limited to 180° motion reversible in sequence with sequential clamp assemblies.

7. The blow molding machine of claim 1 wherein said crank means and engagement means are limited to 180° rotational motion to effect mold platen closure.

8. A multiple station, multiple clamp assembly rotary blow molding machine comprising dual opposed moveable mold platens in each clamp assembly, at least one toggle linkage actuatably attached to each platen, rotatable crank means in engagement with each toggle linkage for actuation thereof, engagement means on said crank means for rotatable actuation thereof, a rotatable actuator at at least one station of said machine, said rotatable actuator engageable with said engagement means for the rotation of said crank means in one direction at said station, said rotatable actuator engageable with the engagement means of the next in sequence clamp assembly upon indexing thereof into said station and rotatable in the opposite direction.

9. The blow molding machine of claim 8 wherein the separate crank means for clamp assemblies in sequence are rotatable in opposite directions to close the dual opposed mold platens in the respective clamp assemblies.

10. The blow molding machine of claim 1 wherein the corresponding toggle linkages of sequential clamp assemblies are positioned on opposite sides of the respective crank means.

11. The blow molding machine of claim 8 wherein the rotary actuator is at the mold close station and a second rotary actuator is at the mold open station, said rotary actuators each rotating the engagement means of each clamp assembly indexed into engagement therewith in the opposite direction from the rotation for the previous clamp assembly indexed therefrom.

12. The blow molding machine of claim 11 including means to prevent rotary motion of the crank means of clamp assemblies outside of the full engagement of the engagement means with either of the rotary actuators.

13. The blow molding machine of claim 11 wherein said rotary actuators are limited to 180° motion reversible in sequence with sequential clamp assemblies.

14. The blow molding machine of claim 8 wherein said crank means and engagement means are limited to 180° rotational motion to effect mold platen closure.

15. A blow molding machine unloader comprising a rotatably indexable vertical shaft, a plurality of gripping means adjacent the top of the shaft and extending downwardly, reciprocable mechanical drive means attached to the vertical shaft and adapted to vertically move the shaft, rotary indexable mechanical drive means in engagement with said shaft and adapted to rotate the shaft, unloader mechanical drive and timing means adapted to connect the unloader and a blow molding machine, said unloader drive and timing means drivably connected to the reciprocable mechanical drive means and the rotary indexable drive means to thereby provide a common mechanical drive for both the vertical reciprocating movement and rotary indexable movement of the unloader.

16. The unloader of claim 15 including a cruciform support extending from the top of said shaft, said gripping means being affixed adjacent the ends of said cruciform support.

17. The unloader of claim 15 wherein said rotary indexable mechanical drive means includes means to rotatably engage the shaft, and wherein trunnion means are affixed adjacent the bottom of the shaft and a crank arm engages the trunnion means, the crank arm being operable by the reciprocable mechanical drive means to raise and lower the shaft as determined by the position and speed of the unloader mechanical drive means.

18. The unloader of claim 15 wherein said shaft rotatably indexes 90° substantially between each vertical reciprocating cycle of the shaft.

19. A multiple station, multiple clamp assembly rotary blow molding machine comprising dual opposed moveable mold platens in each clamp assembly, a rotary indexable table drive in engagement with said multiple clamp assemblies to rotatably index said clamp assemblies from station to station in sequence, a mechanical unloader at at least one station of the machine, said unloader includes a vertical shaft, mecahnical means to vertically reciprocate the shaft and mechanical means to rotatably index the vertical shaft, a mechanical drive connection the rotary indexable table drive to the mechanical unloader, said mechanical drive actuatably timed by the rotary indexable table drive to coordinate the movements of the unloader with the movement of the mold platens at the unloader station.

20. The blow molding machine of claim 19 further including a plurality of gripping means adjacent the top of the shaft and extending downwardly for removing the product at said station when said opposed platens are opened.

21. The blow molding machine of claim 20 wherein the connecting mechanical drive mechanically powers and times the vertical reciprocation means and the rotatable indexing means for the vertical shaft.

22. A multiple station multiple clamp assembly rotary blow molding machine comprising dual opposed moveable mold patens in each clamp assembly, at least one toggle linkage actuatably attached to each platen, rotatable crank means in engagement with each toggle linkage for actuation thereof and engagement means on said crank means for rotatable actuation thereof, said toggle linkages on sequential adjacent clamp assemblies being mirror images of each other traveling in a plane normal to the axis of rotation of the machine, a rotatable actuator means at at least one station of said machine engageable with the engagement means on said crank means to rotate the crank means of each sucessive clamp assembly in an opposite direction as the result of said mirror image of each said adjacent toggle linkage.

23. The blow molding machine of claim 22 further including a second rotatable actuator means at a second station of said machine engageable with said engagement means on said crank means to rotate said crank means of each sucessive clamp assembly in a direction opposite to the respective direction of rotation of said actuator means at said one station.

* * * * *

UNITED STATES PATENT AND TRADEMARK OFFICE
CERTIFICATE OF CORRECTION

PATENT NO. : 4,589,838

DATED : May 20, 1986

INVENTOR(S) : William E. Ziegler

It is certified that error appears in the above-identified patent and that said Letters Patent are hereby corrected as shown below:

Column 1, line 11: Insert --and-- after "closing".

Column 3, line 14: Delete "more" and substitute --motor--.

Column 3, line 54: Delete "the" after "close" and substitute --and--.

Column 7, line 9: Delete "mecahnical" and substitute --mechanical--.

Column 7, line 12: Delete "connection" and substitute --connecting--.

Column 8, line 5: Delete "patens" and substitute --platens--.

Column 8, line 15: Delete "sucessive" and substitute --successive--.

Column 8, line 22: Delete "sucessive" and substitute --successive--.

Signed and Sealed this

Twenty-third Day of September 1986

[SEAL]

Attest:

DONALD J. QUIGG

Attesting Officer

Commissioner of Patents and Trademarks